United States Patent [19]

Aoyama

[11] Patent Number: 4,906,923
[45] Date of Patent: Mar. 6, 1990

[54] SPEED DETECTING APPARATUS INCLUDING A MULTI-COIL DEVICE

[75] Inventor: Noboru Aoyama, Yokohama, Japan
[73] Assignee: Kabushiki Kaisha Toshiba, Kanagawa, Japan
[21] Appl. No.: 256,063
[22] Filed: Oct. 7, 1988

Related U.S. Application Data

[63] Continuation of Ser. No. 932,269, Nov. 19, 1986, abandoned.

[30] Foreign Application Priority Data

Nov. 19, 1985 [JP] Japan ................... 60-259436

[51] Int. Cl.$^4$ ............................... G01P 3/46
[52] U.S. Cl. ................... 324/173; 324/163; 360/78.06; 369/239; 369/221
[58] Field of Search ............... 324/160, 163, 164, 173, 324/174, 207; 340/870.33, 870.36; 360/75, 78, 101, 107, 78.01, 78.06; 369/45, 215, 219, 220, 221, 239, 240

[56] References Cited

U.S. PATENT DOCUMENTS

| | | | |
|---|---|---|---|
| 3,440,532 | 4/1969 | Chung | 324/164 |
| 3,755,745 | 8/1973 | Sapir | 328/133 |
| 4,161,693 | 7/1979 | Carlson | 324/173 |
| 4,462,096 | 7/1984 | Kusaka | 369/45 |
| 4,518,882 | 5/1985 | Morino et al. | 310/15 |
| 4,544,890 | 10/1985 | Albert | 324/173 |
| 4,622,516 | 11/1986 | Hearn et al. | 324/163 |

FOREIGN PATENT DOCUMENTS

| | | | |
|---|---|---|---|
| A2122428 | 1/1972 | France | |
| 146607 | 11/1979 | Japan | 369/219 |
| 523354 | 9/1976 | U.S.S.R. | 324/163 |
| 197708 | 9/1987 | U.S.S.R. | 324/173 |
| A2046452 | 12/1980 | United Kingdom | |

OTHER PUBLICATIONS

Abstract of Japanese Patent Document No. AP-A-61258661 Published Nov. 17, 1986.

Primary Examiner—William M. Shoop, Jr.
Assistant Examiner—H. L. Williams
Attorney, Agent, or Firm—Finnegan, Henderson, Farabow, Garrett and Dunner

[57] ABSTRACT

Apparatus for detecting the speed of a moving object when exposed to primary magnetic flux fields and secondary external magnetic flux fields. The apparatus includes a magnetic device which generates the primary magnetic flux fields, a multi-coil device which carries induced electric currents when exposed to the primary magnetic flux field, and an error correction circuit for offsetting the effect of the magnetic flux from the external magnetic flux sources on the induced electric current. A support device is positioned between the multi-coil device and the magnetic device to allow relative movement therebetween, corresponding to the movement of the object.

8 Claims, 3 Drawing Sheets

SPEED DETECTING APPARATUS INCLUDING A MULTI-COIL DEVICE

This application is a continuation, of application Ser. No. 06/932,269, filed Nov. 19, 1986 now abandoned.

BACKGROUND OF THE INVENTION

1. Field of the Invention

The present invention relates to a speed detecting apparatus to be used for detecting the moving speed of an object, more particularly to an optical pickup which is moved radially relative to a record disc.

2. Description of the Prior Art

Generally, in an optical record reproducing apparatus such as a compact disc player, it is well known for a pickup drive apparatus with a linear motor as a driving source to be used for moving an optical pickup radially relative to an optical disc. In such a compact disc player, a speed detecting apparatus for detecting the moving speed of the optical pickup is provided corresponding to the pickup drive apparatus and high-accuracy positioning of the optical pickup is performed by controlling the linear motor in conjunction with the moving speed signal detected by the speed detecting apparatus.

FIG. 9 shows a conventional speed detecting apparatus together with a pickup device and a pickup drive apparatus.

Numeral 1 designates an optical pickup main body, the upper face of which faces an optical disc (not shown in the drawing). The body 1 is mounted on guide shafts 3 and 4 and is movable in the direction of the arrows A and B on bearings 2 (only one of them is shown in the drawing). On the upper surface portion of the optical pickup main body 1, there is a focusing lens 1a for irradiating a laser beam and, on the under surface portion, a support plate 5 is provided. At one end portion of the support plate 5 there is mounted a linear motor 6 for radial drive. The linear motor 6 comprises a coil unit, for example, a bobbin 6b wound with a drive coil 6a, attached to the support plate 5, and a box-shaped magnetic member 6, or yoke, one side of which passes through the bobbin 6b. A permanent magnet 6d is attached to the inside of the magnetic member 6c, facing the drive coil 6a, to form a magnetic field.

On the other end of the support plate 5, there is attached a coil unit 7 for detecting the optical pickup moving speed. For example, the coil unit 7 may include a bobbin 7a wound with a detecting coil 7b (not shown). One side of a frame-shaped magnetic member or yoke 8 passes freely through the coil unit 7. The frame-shaped magnetic member 8 may be constructed from two or four separate pieces. A magnet 9 is attached to the inside the magnetic member 8, facing the detecting coil 7b, to form a magnetic field.

In the construction described above, the drive coil, 6a is provided in a magnetic circuit, formed by the magnetic member 6c and the magnet 6d and, when a current is applied to the drive coil 6a, an energizing force conforming to Fleming's left hand rule is generated. The optical pickup main body 1 is thus moved in the direction of arrows A and B through the bobbin 6b, according to the direction of the current, and a laser beam is radiated on to the optical disc (not shown in the drawing) through the focusing lens 1a. Simultaneously, the support plate 5 with attached bobbin 7a wound with the detecting coil 7b moves in the same direction. Since the detecting coil 7b is provided in a magnetic field formed with the magnetic member 8 and the magnet 9 and cuts the magnetic flux therebetween, an inductive electromotive force is generated in the coil in proportion to the moving speed, conforming to Fleming's so-called right hand rule, and a detecting section (not shown in the drawing) detects the moving speed of the optical pickup main body 1 from the changes in the electromotive force.

Through this operation, the detecting section (not shown in the drawing) controls application of the current to the drive coil 6a of the linear motor 6 and controls the position of the optical pickup main body 1.

However, in such a speed detecting apparatus there is the possibility that an external electric field can have an adverse influence upon the performance of the device. For example, when the linear motor 6 is used as described above, it is necessary to space it from the position of the speed detecting apparatus so that the apparatus is not detrimentally influenced by the magnetic field. As a result, the combined structure must be made larger.

Also, there is some clearance produced between the bearing 2 and the guide shaft 3 of the optical pickup main body 1. When the drive coil 6a is moved at a high speed in the direction of the arrows A and B, the drive section of the optical pickup main body 1 is rotated by the inertial force of the drive system around the axis of inertia positioned between the drive coil 6a and the detecting coil 7b. As a result, the drive coil 6a and the detecting coil 7b have speed components (speed vectors) in opposite directions from one another. The phase of the control signal fed back from the detecting coil 7b to the drive coil 6 is reversed and the drive system oscillates resulting in degradation of control.

The same problems arise in the case of a signal treatment apparatus with an optical pickup device utilized in an acoustic instrument such as a laser disc and in the case of an optical pickup and a magnetic head utilized in an information apparatus such as an optical disc memory apparatus or a magnetic disc memory apparatus.

SUMMARY OF THE INVENTION

Accordingly, an object of the present invention is to provide a speed detecting apparatus so designed as to facilitate miniaturization.

Another object of the present invention is to to improve the accuracy of detection of the speed of an optical pickup.

In order to achieve the above objects, the apparatus for detecting the speed of a moving object in an environment exposed to primary magnetic flux field and secondary external magnetic flux fields includes an apparatus for generating at least two electric currents corresponding to the speed of the object and for offsetting the effect of the magnetic flux from the external magnetic flux sources on the induced electric currents, including, a magnetic device for generating the primary magnetic flux fields, a multi-coil device exposed to the primary magnetic flux fields for carrying the induced electric currents, an error correction circuit for offsetting the effect of the magnetic flux from the external magnetic flux sources on the induced electric currents, and a support device for supporting the multi-coil device and the magnetic device for relative movement therebetween, the movement corresponding to the movement of the object.

DESCRIPTION OF THE PREFERRED EMBODIMENT

Figure 1:
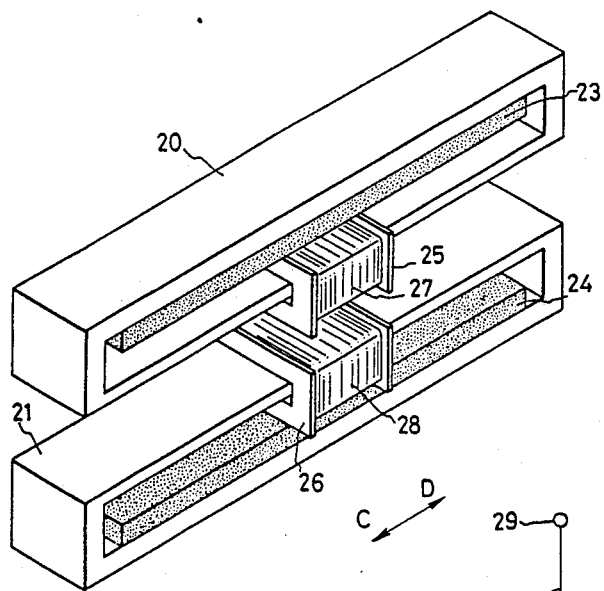
FIG. 1 is a perspective view of part of a speed detecting apparatus according to one embodiment of the present invention.

The present invention will be described in detail with reference to the accompanying drawings, namely, FIGS. 1 to 8. Throughout the drawings, like reference numerals and letters are used to designate elements like or equivalent to those used in FIG. 9 (prior art apparatus) for the sake of simplicity of explanation.

Figure 2:
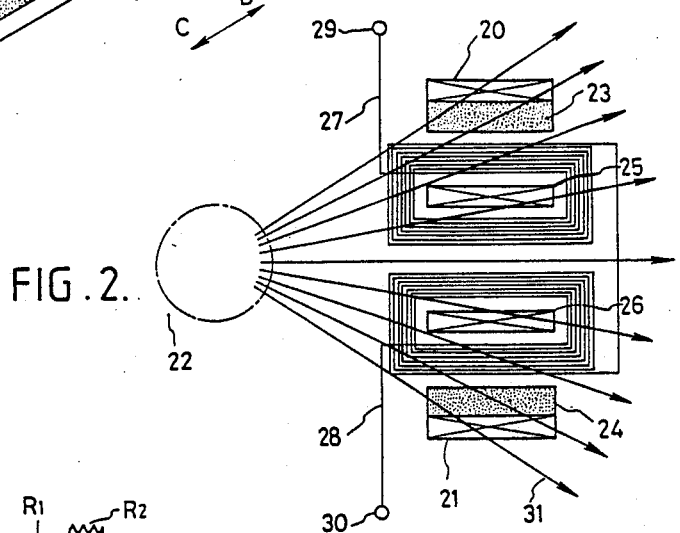
FIG. 2 is a diagramatic representation of the arrangement of FIG. 1.

Referring now to the drawings, an embodiment of the speed detecting apparatus according to the present invention will be described in detail. FIG. 1 shows a speed detecting apparatus representing an embodiment of the present invention. In the drawing, the numerals 20 and 21 designate two magnetic members/member 20, a first magnetic member and a second magnetic member 21, which may be the only two members used or which may be two members of a larger number of magnetic members. As shown in FIG. 2, the first and second magnetic members 20 and 21 are substantially symmetrically positioned relative to an external magnetic field generating section 22 and first and second magnets 23 and 24, respectively each magnetized to provide two poles (N, S), and are each attached each to one side portion of the inside of each of the magnetic members 20 and 21 to form two magnetic fields. Also, on the other side portions of the inside of the first and second magnetic members 20 and 21, are provided first and second bobbins 25 and 26, respectively each constituting a coil unit, and mounted so that they can be moved simultaneously in the direction of the arrows C and D. The first and the second bobbins 25 and 26 are linked to the optical pickup main body 1 (see FIG. 9) and carry respectively, a first and a second coil 27 and 28, wound in opposite directions with respect to each other. One of the first and the second coils, e.g., the first coil 27 is connected to one end of the second coil 28 and to ground. The other ends, output ends 29 and 30, are connected to a detecting section through, for example, a mixing unit (not shown in the drawing).

In construction described above, the first and the second coils 27 and 28 of the first and the second bobbins 25 and 26 are simultaneously moved in the same direction with respect to the first and the second magnets 23 and 24 upon movement of the pickup. The momentary induced electromotive force in the coils 27 and 28 are inputted to the mixing unit (not shown) from each output end 29, 30. These signals are mixed and fed as inputs to a detecting section (not shown) to detect the moving speed of the coils 27 and 28.

In this embodiment, when a leakage flux 31 from an external magnetic field generating section 22 passes through the first and the second coils 27 and 28, equal and opposite voltages are generated by the leakage flux 31, and, therefore, they offset each other. Only the change of electromotive force in accordance with movement relative to the first and the second magnets 23 and 24 is extracted and outputted in the mixing unit (not shown) to detect the speed.

As described above, the speed detecting apparatus has a construction in which the first and the second coils 27 and 28, one of which is wound in a reverse direction, can be moved simultaneously and any disturbing effect of the leakage flux 31 from the external flux generating section 22 can be securely prevented. It is possible, therefore, to detect the speed with high-precision and also to position the apparatus adjacent to the external flux generating section 22. Accordingly it is possible to further miniaturize the apparatus in comparison with conventional apparatus of this type.

Figure 3:
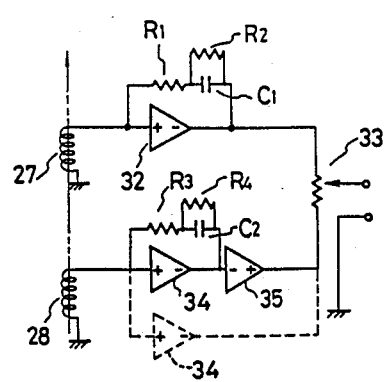
FIG. 3 is a circuit diagram of a second embodiment of the present invention.

Further, for improving the operation of the apparatus according to the present invention, a balance adjusting equalizer circuit can be added to the output ends 29 and 30 of the first and the second coils 27 and 28, as shown in FIG. 3, so that any imbalance of the first and the second coils 27 and 28 can be corrected.

When the speed signal content of the outputs of the first and the second coils 27 and 28 are of opposite polarity sense, one end of a variable resistor 33 is connected to the output end 29 of the first coil 27 through a first frequency characteristic correction circuit. The first frequency characteristic correction circuit comprises an operational amplifier 32, resistors R1 and R2, and a capacitor C1. The other end of the variable resistor 33 is connected to the output end 30 of the second coil 28 through a second frequency characteristic correction circuit comprising an operational amplifier 34, an inverting amplifier 35, resistors R3 and R4, and a capacitor C2 to provide a balance adjustment due to displacement of the positions of the first and the second bobbins 25 and 26. If the speed signal content of the outputs of the first and the second coils 27 and 28 are of the same polarity sense, it is sufficient to provide only the operational amplifier 34, together with the resistors R3 and R4 and capacitor C2, between the output end 30 of the second coil 28 and the other end of the variable resistor 33, as shown in broken lines in the drawing.

In the above described embodiment, the first and the second bobbins 25 and 26 are described as being movable. However, the present invention is not limited to this. It is possible to fix the first and the second bobbins 25 and 26 and to make the first and the second magnets 23 and 24 movable.

Further, the magnetic field and the coil assemblies of the speed detecting apparatus according to the present invention may alternatively, for example, be constructed in accordance with one of FIGS. 4 to 8. In each Figure, the same elements as in FIG. 1 are given like reference characters and have the same function and therefore, detailed description is not required.

Figure 4:
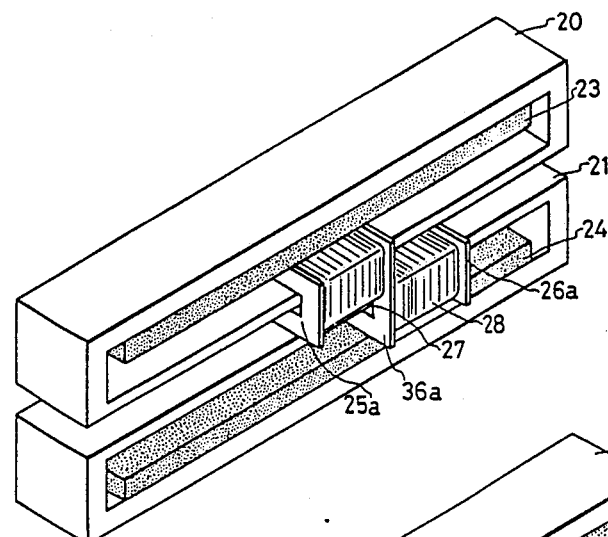
FIG. 4 to FIG. 8 show perspective views of parts of other embodiments of the present invention, corresponding to the parts shown in FIG. 1.

In the embodiment of FIG. 4, for further promoting miniaturization, the apparatus is designed so that first and second bobbins 25 and 26 are connected by a connection plate 36a.

Figure 5:
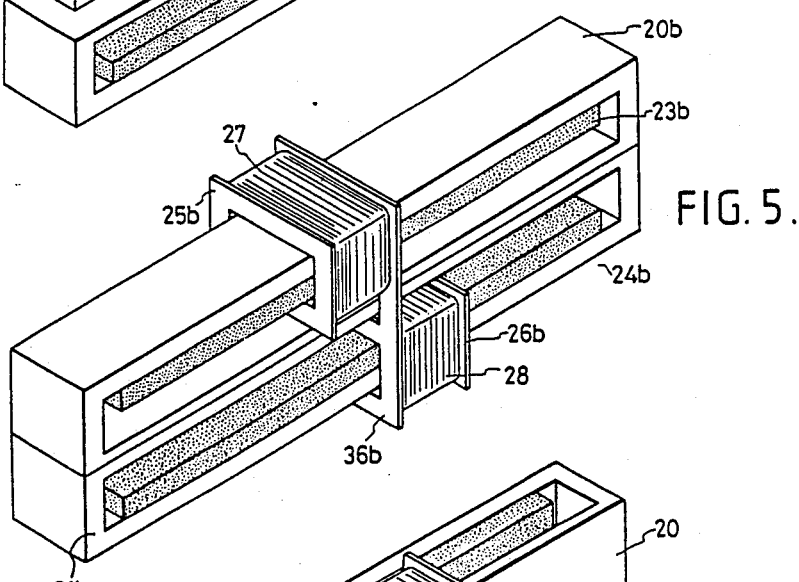

In the embodiment of FIG. 5, for simplifying assembly work, the apparatus is designed so that first and second magnetic members 20b and 21b are connected to the first and the second bobbins 25 and 26 by a support plate 36b and are inserted into mounting positions surrounding first and second magnets 23 and 24.

Figure 6:
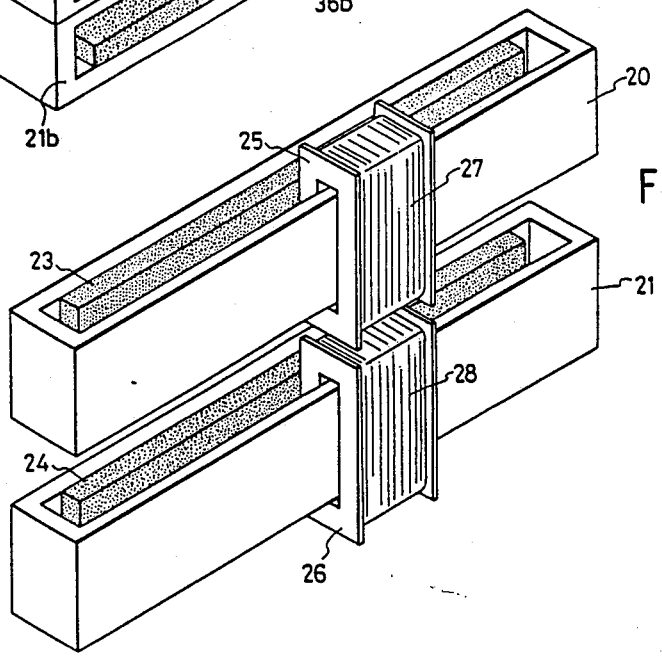

In the embodiment of FIG. 6, the arrangement of the first and the second magnetic members 20 and 21 is changed and they have their longer sides in the same plane.

Figure 7:
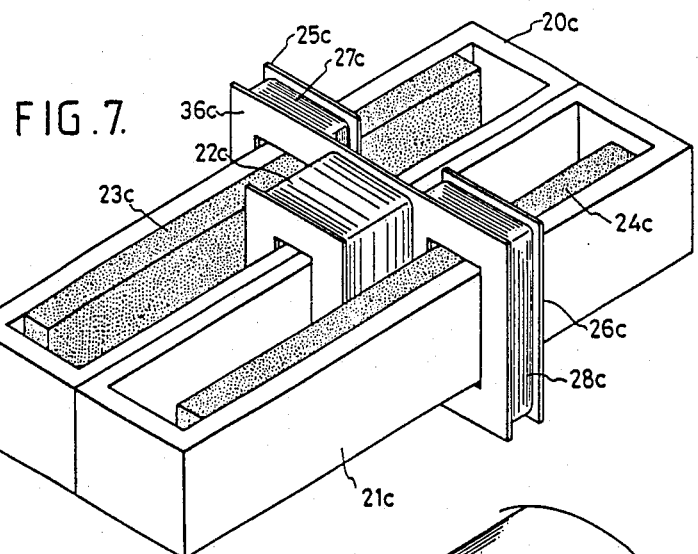

In the embodiment of FIG. 7, to enable reduction of the number of parts, improve the function, and promote miniaturization, the apparatus is designed so that a support plate 36c is provided on first and second magnetic members 20c and 21c of an external field generating section 22c, such as a linear motor, as well as on first and second bobbins 25c and 26c.

Figure 8:
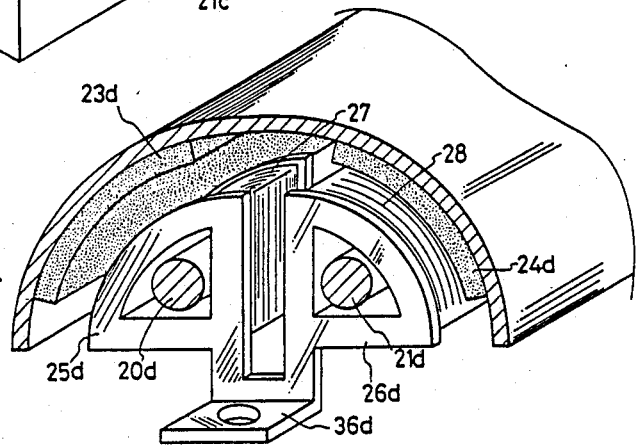
Figure 9:
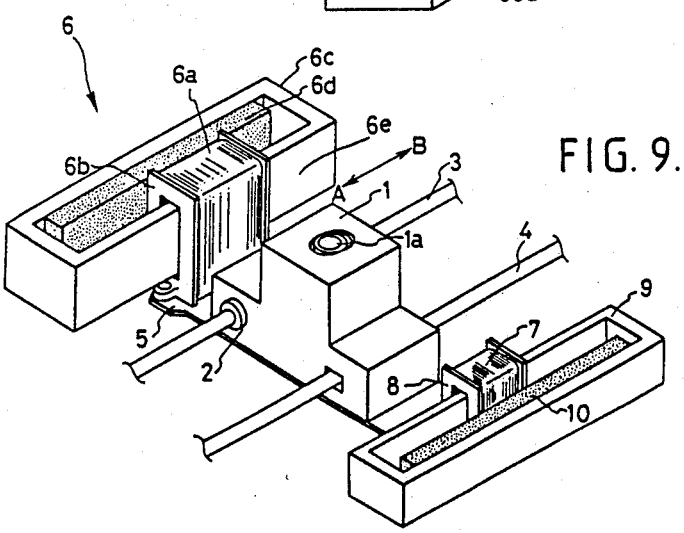
FIG. 9 is a perspective view showing a conventional speed detecting apparatus together with a pickup device and a linear motor.

In the embodiment of FIG. 8, for improving the efficiency, the apparatus is designed so that arcuate first and second magnets 23d and 24d, first and second bobbins 25d and 26d, and first and second coils 27 and 28 correspond to first and second magnetic members 20d and 21d to increase the effective length of the coils. In the drawing, reference numeral 36d designates a support connecting the first and the second bobbins 25d and 26d.

In the embodiments described above, description is given of several apparatus in which two coils are used. However, the number of coils is not limited to two, but substantially the same effect can be obtained by providing a plurality of coils of suitable dimensions so that they can be moved simultaneously relative to one another. At least one of the coils must be wound in a rearward direction to the other coils.

Although the present invention has been described in several forms, many widely different embodiments of the present invention may be made without departing from the spirit and scope thereof.

As explained above, the present invention can provide a speed detecting apparatus so designed as to facilitate miniaturization and improve detecting accuracy.

What is claimed is:

1. Apparatus for detecting the speed of a moving object in an environment exposed to primary magnetic flux fields and secondary external magnetic flux fields, comprising:
   means for inducing at least two electric currents, one of said electric currents corresponding to the speed of the object and one of said electric currents for offsetting the effect of the magnetic flux from the external flux sources on the induced electric currents, including
       magnetic means, including at least a first and a second magnet, for generating the primary magnetic flux fields,
       multi-coil means, including at least two coils, including a first coil and a second coil, exposed to the primary magnetic flux fields for carrying the induced electric currents, for generating at least two speed signals induced responsive to the primary magnetic flux field and at least two error signals induced responsive to the secondary external magnetic flux fields, said first and second coils respectively being positioned adjacent said first and second magnets, said magnetic means being fixed in position relative to said multi-coil means and said first coil and said second coil being simultaneously movable relative to said first and second magnets and being positioned adjacent said secondary external magnetic flux fields,
   error correction circuit means for offsetting the effect of the magnetic flux from the external magnetic flux sources on the induced electric currents, said error correction circuit means including a circuit for combining the induced speed signals, said combining circuit including a frequency characteristic correction circuit corresponding to each coil, each said frequency characteristic correction circuit including an operational amplifier, a first resistor, and an integrating circuit; and
   support means for supporting the multi-coil means and the magnetic means and for allowing relative movement there-between, the movement corresponding to the movement of the object.

2. The apparatus of claim 1 wherein the at least two speed signals are of the same polarity and said at least two error signals are of the opposite polarity.

3. The apparatus of claim 2, wherein the two coils are wound in opposite directions relative to each other.

4. The apparatus of claim 1 wherein the at least two speed signals are of the opposite polarity and said at least two error signals are of the same polarity.

5. The apparatus of claim 4 wherein the two coils are wound in the same direction relative to each other, and the signal combining circuit includes an inverter for reversing the induced electric current from one of the coils.

6. The apparatus of claims 1 wherein the object is an optical pickup for an optical record reproducing apparatus, and the support means includes means for simultaneously moving the pickup and the multi-coil means.

7. The apparatus of claim 1 further including:
   a first bobbin on which said first coil is wound;
   a second bobbin on which said second coil is wound;
   a first magnetic member, said first magnet being attached to a first side portion of said first magnetic member, said first bobbin being mounted for movement along a second side portion of said first magnetic member adjacent said first side portion; and
   a second magnetic member, said second magnet being attached to a first side portion of said second magnetic member, said second bobbin being mounted for movement along a second side portion of said second magnetic member adjacent said first side portion of said second magnetic member.

8. The apparatus of claim 1 further including:
   a first bobbin on which said first coil is wound;
   a second bobbin on which said second coil is wound;
   a first magnetic member, said first magnet being attached to a side portion of said first magnetic member, said first bobbin being mounted for movement along said side portion of said first magnetic member; and
   a second magnetic member, said second magnet being attached to a side portion of said second magnetic member, said second bobbin being mounted for movement along said side portion of said second magnetic member.

* * * * *